Figure 1:
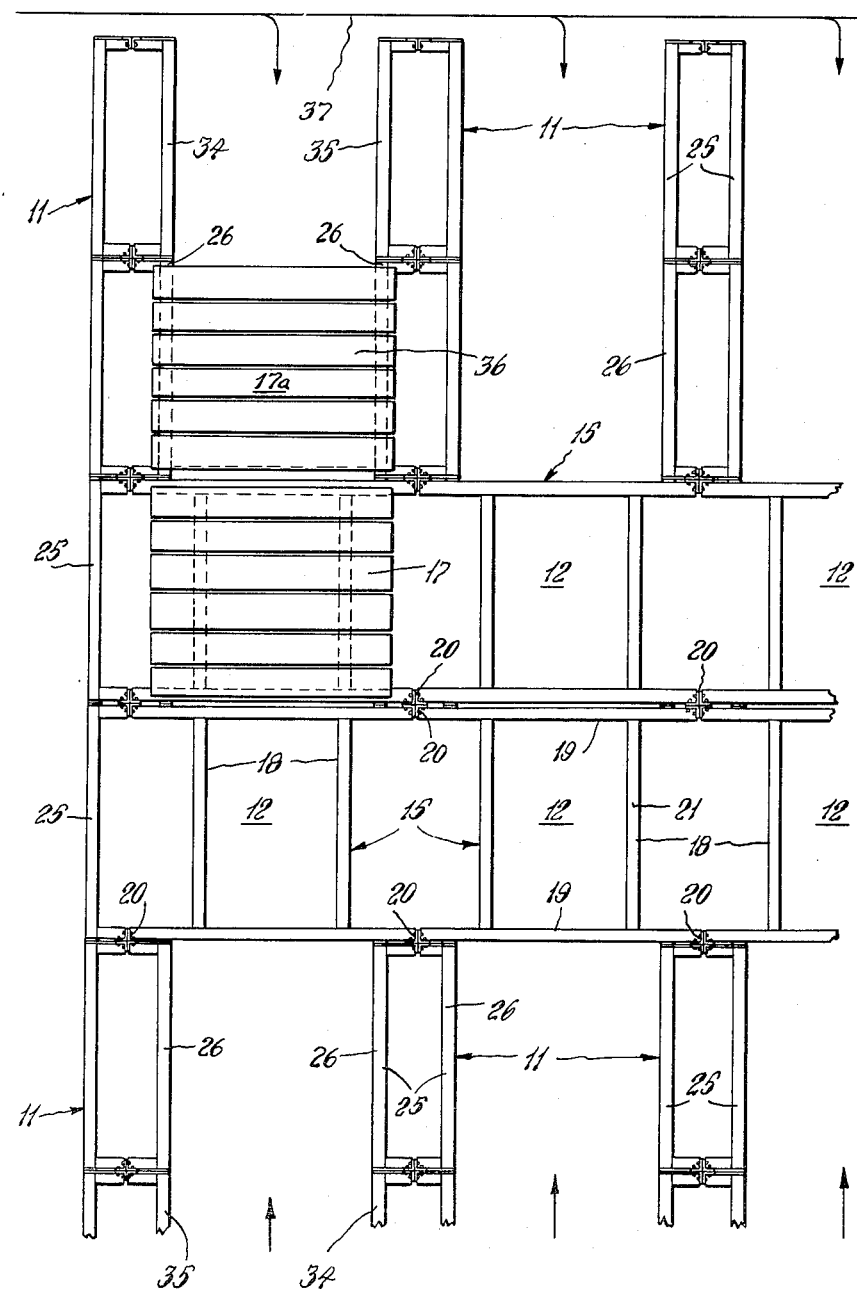

July 19, 1960

W. J. HIGGINS 2,945,596

EXTENDIBLE RACK STRUCTURE FOR
STORAGE, EMBODYING
WING EXTENSIONS

Filed Aug. 1, 1958

3 Sheets-Sheet 1

INVENTOR.
WILLIAM J. HIGGINS
BY
Louis B. Applebaum
ATTORNEYS

July 19, 1960

W. J. HIGGINS 2,945,596

EXTENDIBLE RACK STRUCTURE FOR
STORAGE, EMBODYING
WING EXTENSIONS

Filed Aug. 1, 1958

3 Sheets-Sheet 2

INVENTOR.
WILLIAM J. HIGGINS

BY
Louis B. Applebaum
ATTORNEYS

July 19, 1960
W. J. HIGGINS
2,945,596
EXTENDIBLE RACK STRUCTURE FOR STORAGE, EMBODYING WING EXTENSIONS
Filed Aug. 1, 1958
3 Sheets-Sheet 3
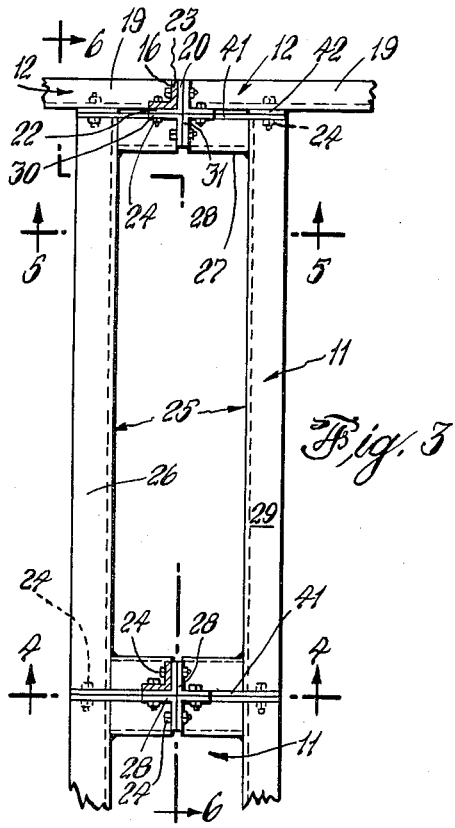
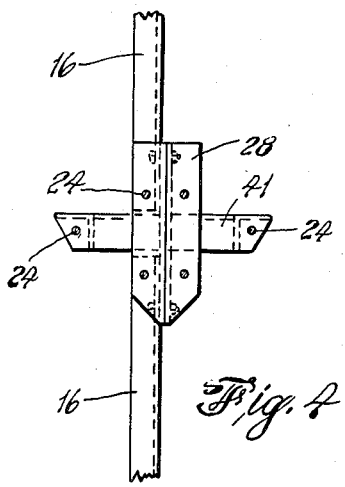
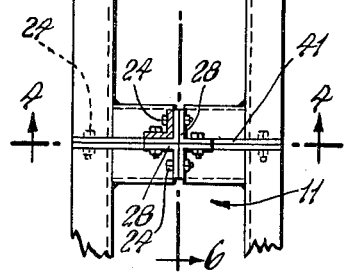
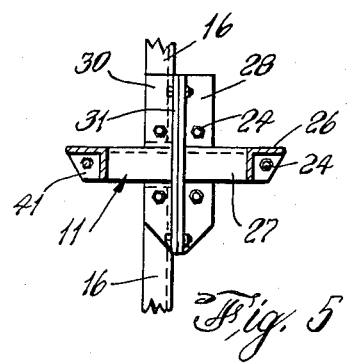
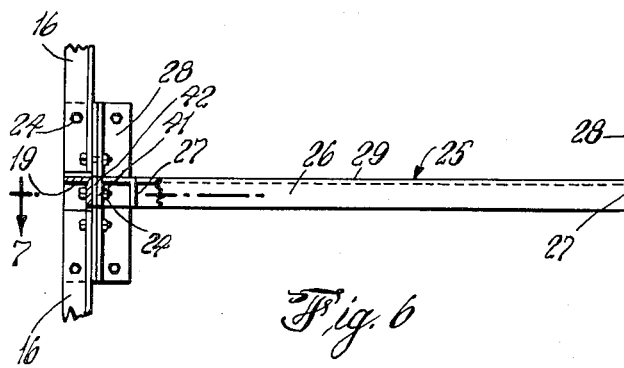
INVENTOR.
WILLIAM J. HIGGINS
BY
ATTORNEYS United States Patent Office 2,945,596
Patented July 19, 1960

2,945,596

EXTENDIBLE RACK STRUCTURE FOR STORAGE, EMBODYING WING EXTENSIONS

William J. Higgins, 12 Capp St., Shore Crest, Carteret, N.J.

Filed Aug. 1, 1958, Ser. No. 752,677

1 Claim. (Cl. 211—134)

(Granted under Title 35, U.S. Code (1952), sec. 266)

The invention described herein may be manufactured and used by or for the Government of the United States of America for governmental purposes without the payment of any royalties thereon or therefor.

The present invention pertains to the art of storing stock on pallets or the like structures, and is embodied in rack structure for storing stock resting on pallets.

The present invention is an improvement over my copending application, Serial No. 727,749, filed April 10, 1958, the present invention enabling more extensive and versatile use of rack structures generally, and of the particular rack structure of my copending application.

Under practice of the invention of my copending application, a variety of different stock items may be stored in rack structure positioned for each different item to be selectively accessible for handling by means of a standard truck. The practice of my copending application is adapted for the usual limited stock inventories, and requires aisles along which trucks travel to any space of the rack that is allocated to support a pallet of stock. Truck aisles constitute floor area that is part of the total area allotted for storage, and are kept open for trucks to travel freely. Therefore, floor areas of truck aisles are not available for storage space of stock.

Floor area that is allotted for storage is employed more economically under practice of the present invention, in that a greater proportion of the total floor area is available for storage by reducing the proportionate aisle area with reference to the total floor area. The present invention is embodied in wing extensions which are attachable to any suitable rack structure to extend forwardly from the front thereof, the wing extensions providing additional area for supporting stock resting on pallets.

Where stock inventories are very high, wing extensions may be used advantageously, as also when truck traffic along aisles is limited, for example, when stock is drawn and replaced at infrequent intervals. The present invention is particularly useful for dead storage, or for stock piling in anticipation of an eventuality at some future time, when all the stock may be withdrawn from storage to meet the eventuality. The present invention reduces the proportionate floor area that is allotted to truck aisles, and under some circumstances truck aisles may be eliminated completely.

Wing extensions consist of extension members which are detachably attachable to each other to constitute a wing extension, all extension members being interchangeably alike. Each extension member comprises a rest and juncture members secured thereto, one at each of opposite ends. Each juncture member embodies web faces at right angles to each other in planes that are normal to the rest surface of the rest. One web face of each juncture member is in the frontage-wise direction with reference to the rack structure, the other web face being disposed depth-wise.

In an extension member, frontage-wise web faces of its juncture members are positioned parallel to each other at opposite ends of the extension member, and at opposite ends of a wing extension consisting of extension members. The distance between opposite frontage-wise web faces of an extension member measures the length of a wing extension. Pallets, being rectangular, are stored in rack structure, and are handled by trucks accordingly, with one dimension of a pallet rectangle extending depth-wise of the rack structure, and the other dimension extending frontage-wise. The length of a wing extension is established to contain the depth-wise dimension of a pallet between frontage-wise web faces of the juncture members of its extension members. Depth-wise web faces of the several juncture members of an extension member lie in the same plane, and are companion to each other in any two of several extension members.

Fasteners embodied in depth-wise web faces of the juncture members of an extension member are companion to each other in different extension members, any two of which may be attached to each other to constitute a wing extension by abutting their companion depth-wise web faces and securing their companion fasteners. Fasteners embodied in frontage-wise web faces of the juncture members of an extension member are companion to each other in different extension members, and any two-wing extensions may be attached to each other end-to-end by abutting companion web faces of their respective extension members and securing companion fasteners. This enables wing extensions to be attached to each other end-to-end in a line, which may be of any desired length.

Fasteners are provided at desired intervals along the front of rack structure that supports stock resting on pallets, fasteners of the rack structure being companion to fasteners of frontage-wise web faces of the juncture members of the several extension members which constitute a wing extension. A wing extension, or a line of several wing extensions, thereby may be attached to rack structure projecting depth-wise forwardly from its front. At intervals along the front of rack structure, lines of wing extensions may be extended forwardly to extents which are limited only by available floor area that is allotted for storage. Truck aisles are reduced thereby to a minimum.

Rack structure for storing stock on pallets comprises a platform rest which extends horizontally in a line along the front of the structure, and defines rectangular areas in a row, each adapted to contain a pallet. Dimensions of any defined area of the platform rest correspond with dimensions of a pallet with clearance that enables a truck approaching depthwise toward the front of the rack structure to place a pallet safely in its assigned position, or to remove a pallet from storage. Orientation of a pallet on a truck approaching rack structure determines orientation of the pallet's position in rack structure, and establishes corresponding depth-wise and frontage-wise dimensions of a pallet and the defined area of a platform rest which receives a pallet in rack structure.

Fasteners of rack structure companion to fasteners of wing extensions are located at intervals along the front of rack structure where adjacent defined areas of the platform rest meet edge-to-edge along their depth-wise edges. This locates an attached wing extension, or an attached line of wing extensions, each at an interval where adjacent defined areas of the platform rest meet along the front of rack structure, and also at each end of the rack structure if desired. Each two adjacent wing extensions which are attached to rack structure provide space for a pallet to rest, adjacent lines of wing extensions thereby providing a line of pallet rest spaces extending along the lines of wing extensions depth-wise towards the front of rack structure, which are in addition to the corresponding defined area of the platform rest that also accommodates a pallet. Any number of additional rest spaces may be provided by means of the structure of wing extensions constituting the present invention, within limits of available floor area that is allotted to storage.

Proximate rests of proximate extension members of adjacent wing extensions are located relative to each other to engage a pallet in support thereof near its respective opposite depth-wise edges. Each wing extension supports proximate depth-wise edges of two adjacent pallets. The rest is positioned in any extension member to locate proximate rests of adjacent wing extensions far enough apart to form an aisle between them, along which a pallet carrying truck may travel depth-wise towards or away from the front of rack structure, with access to the corresponding defined area of the platform rest, and with access to each pallet rest space of adjacent wing extensions additionally.

Common rack structure consists of several platform rests, one above the other in several tiers. Legs are attachable to wing extensions projecting downwardly in support thereof, and supporting legs are attachable at suitable intervals along a line of wiring extensions to support it and its load of stock resting on pallets. Any leg may be attached to project upwardly from a wing extension also, to support another wing extension which is attached at its opposite end in position above the lower wing extension. Wing extensions which are assembled thereby in tiers, extend the rack structure vertically according to the number of tiers in the rack structure, as well as horizontally forwardly from a front of the rack structure.

Wing extensions of my present invention are rendered conveniently attachable to rack structure of my earlier invention in structure of wing extensions which adapt them to the earlier rack structure to add to its versatility.

My copending application discloses platforms, all alike, and legs which are alike also, constituting the only essential components of the rack structure, including fastening devices constituting the only additional element. In the earlier rack structure, platforms are attachable to each other edge-to-edge along either frontage-wise or depth-wise edges, to constitute an extended platform rest in which each platform defines an area of the platform rest for containing a pallet, the several defined areas extending along one or two aisles on which the rack structure fronts, and along which each defined pallet rest area is accessible to a truck traveling along the aisle. One embodiment constitutes a platform which defines a rectangle that contains one pallet only.

As disclosed in my earlier application, each platform comprises a juncture member at each of its four corners, and each juncture member comprises a frontage-wise and a depth-wise web faces at right angles to each other and severally located to define the corresponding corner of the platform in each juncture member. Depth-wise web faces in different platforms are companion to each other, and comprise fasteners by means of which platforms are attached to each other along depth-wise edges, constituting a row of platforms extending frontage-wise and fronting on a truck aisle. Frontage-wise web faces also are companion to each other in different platforms, and comprise companion fasteners by means of which platforms are attached to each other depth-wise enabling two rows of platforms to front along parallel and opposite truck aisles. Opposite depth-wise edges of platforms are interchangeable for attaching platforms to each other frontage-wise, and opposite frontage-wise edges are interchangeable to attach platforms to each other depth-wise. This structure provides frontage-wise web faces which are exposed at intervals of platform dimensions along any front of rack structure, and frontage-wise web faces of juncture members in wing extensions are made companion to these exposed frontage-wise web faces along any front of rack structure, with companion fasteners.

By reason of the location of exposed web faces along any front of rack structure, a wing extension which is attached to project from the front of rack structure extends from a point where adjacent platforms meet along their depth-wise edges, and adjacent wing extensions extend from respective opposite ends of the platform frontage-wise. Thus, a line of rest spaces for pallets in adjacent wing extensions of adjacent parallel lines of wing extensions is directed depth-wise in line with the defined pallet-rest area of the corresponding platform.

Any leg is attachable to any platform by attachment to a juncture member thereof, by means of standard fastening devices, and a like leg is attachable to a like juncture member of a wing extension by means of like fastening devices. Therefore, to practice the present invention, extension members are the only essential component in addition to platforms and legs of the earlier invention.

Figure 2:
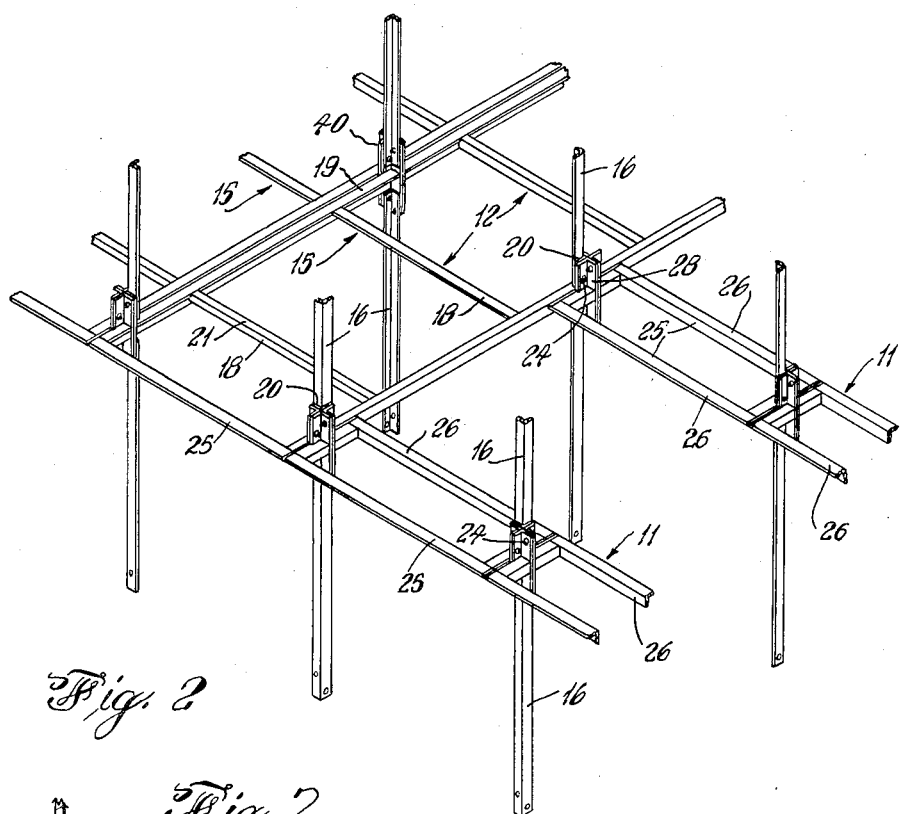
Figure 7:
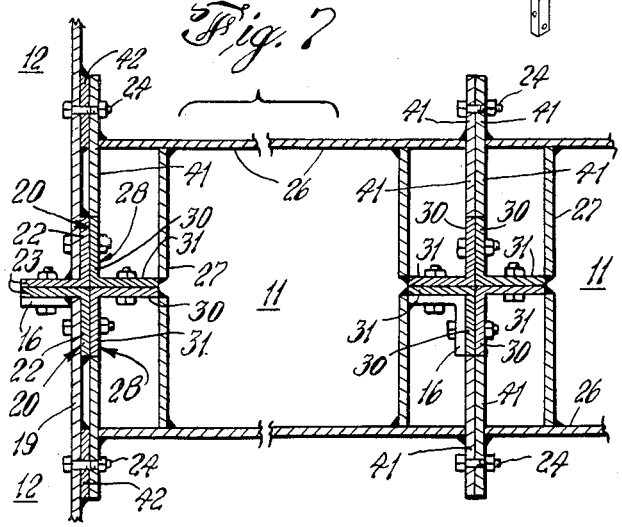

Embodiment of the present invention is disclosed in the accompanying drawings, in which Fig. 1 is a plan of rack structure, with wing extensions attached thereto, Fig. 2 is a fragmentary perspective of rack structure of Fig. 1, Fig. 3 is a detailed plan of a wing extension, Fig. 4 is a cross-sectional elevation, taken on line 4—4 of Fig. 3, Fig. 5 is a cross-sectional elevation, taken on line 5—5 of Fig. 3, Fig. 6 is a cross-sectional elevation, taken on line 6—6 of Fig. 3, and Fig. 7 is a cross-sectional plan, taken on line 7—7 of Fig. 6.

As seen in Fig. 1, wing extensions 11 are attached to rack structure at intervals, rack structure of the disclosure being the same as in my earlier application, and comprising rack units 12. As seen more clearly in Fig. 2, each rack unit 12 comprises a rectangular platform 15, and a leg 16 attached at each of its four corners. Platforms 15 are attached to each other edge-to-edge in successive units 12 in a row of units. Platforms 15 also may be attached to each other to constitute two rows of units 12 which front oppositely, as seen in Fig. 1.

In structure of the disclosure, the rectangle of any platform 15 defines an area of a size to contain a pallet 17, which enables pallets to be stored in rows with each pallet accessible from a front of the rack structure. Each platform 15 consists of parallel rest rails 18 secured in position by means of transverse rails 19 that are parallel, with a juncture member 20 secured at each end of each transverse rail, and severally located at respective corners of the rectangle of platform 15. Suitable lengths of any suitable elongated stress member constitute the rest and transverse rails 18 and 19, angle iron being employed with a web face 21 of each rest rail located in a plane common to both, to constitute a rest surface for a pallet 17. Each juncture member 20 also constitutes a length of angle iron, right angularly disposed web faces of its webs 22 and 23 being located to define the corresponding corner of the platform rectangle, and extending each normal to the plane of web face 21.

In different platforms 15, webs 22 of juncture members 20 are companion to each other, with opposite edges of any platform being alternatively companion. Fasteners are companion in companion webs 22, and consist of bolt holes which register with each other in faces of companion webs 22 abutted against each other. The platform rest of rack structure is extended in one direction thereby, and is extended in a second direction by webs being similarly companion to each other in different platforms 15, with selected edges of any platform being alternatively companion. Bolt holes of companion webs 23 also register with each other when their web faces are abutted. All bolt holes of webs 22 and 23 of any juncture member 20 are the same size, and a uniform standard of bolts and nuts 24 fit any bolt hole for assembling rack structure of rack units 12.

Each wing extension 11 consists of two extension members 25, which are attached to each other by means of standard bolts and nuts 24. All extension members 25 are alike, and are mutually interchangeable.

An extension member 25 consists of a rest 26 in the form of a rail, with transverse rails 27 by means of which a juncture member 28 is attached to a rest 26 at each of its opposite ends. Rest rails 26 and transverse rails 27 consist each of a suitable length of elongated stress members, of which angle iron is shown in the drawings. Juncture members 28, being the same as juncture members 20 of platforms 15, also consist of lengths of angle iron, and the rest and transverse rails 26 and 27 of any extension member 25, with the juncture members 28, are secured to each other rigidly, by welding for example.

A web face 29 of any rest rail 26 describes a plane, and constitutes a surface of rest for a pallet 17. Juncture members 28 of any extension member 25 comprise each the webs 30 and 31, faces of which are at right angles to each other, and lie each in a plane normal to the plane of web face 29 of rest rail 26. As in the case of angle iron that constitutes any juncture member 20 extending oppositely away from the plane of rest surfaces 21 in any platform 15, the angle iron of any juncture member 28 extends oppositely above and below rest plane 29 of any extension member 25.

Faces of webs 30 are positioned parallel to each other in any extension member 25, and the distance between faces of webs 30 is determined by one dimension of any pallet 17 to be the same as the distance between faces of frontage-wise webs 22 of juncture members 20 which are secured to corresponding ends of the opposite transverse rails 19 of any platform 15.

In the case of webs 31 of any extension member 25, their faces are located in the same plane, are companion to each other in different extension members, and comprise fasteners companion to each other and consisting of bolt holes which register when companion webs 31 abut each other. Bolt holes of webs 31 are the same size as bolt holes of webs 22 and 23 of juncture members 20 in platforms 15, and standard bolts and nuts 24 fit. Thus, abutting any two extension members 25 along their companion webs 31, and attaching them to each other by means of bolts and nuts 24, constitutes a wing extension 11.

In extension members 25, webs 30 also comprise bolt holes as fasteners which are companion to each other in different extension members. When several extension members 25 are positioned end-to-end with their rest rails 26 aligned, their abutting webs 30 are companion to each other, and their bolt holes register. In wing extension 11 constituting extension members 25 attached to each other, contacting webs 30 of several wing extensions positioned end-to-end are companion to each other for attachment by means of bolts and nuts 24, and this companion relationship is interchangeable alternatively at opposite ends of any wing extension. Time is saved thereby in the labor of attaching wing extensions end-to-end, the operator not being required to try a wing extension 11 for the end that fits because both ends fit.

In the juncture members 28 of any extension member 25, its bolt holes in webs 30 are positioned to register with bolt holes of companion webs 22 of juncture members 20 in platforms 15, which also saves time in the labor of attaching any extension member 11 at the front of rack structure consisting of rack units 12. In any two platforms 15 attached to each other along edges of companion juncture members 20 to extend rack structure in one direction, bolt holes of their several webs 22 register with bolt holes of two webs 30 in juncture members 28 of any two extension members 25 which are attached to each other along webs 31 to constitute a wing extension 11, this being inherent in the structure of juncture members 28 being like juncture members 20. The companion registry of bolt holes, in addition to being interchangeable alternatively at opposite ends of any wing extension, also is interchangeable at any point along a front of rack structure where juncture members 20 of different platforms 15 are attached to each other, exposing their webs 22. The operator merely positions a wing extension 11 and attaches it wherever indicated by exposed webs 22 of juncture members 20 attached to each, without trying for fit because both ends of the wing extension fit.

As seen in Fig. 1, wing extensions 11 may be attached along either front of rack structure consisting of rows of racks units 12 whenever exposed webs 22 appear along a rack structure front, of juncture members 20 that are attached to each other, and wing extensions may be attached to attached wing extensions end-to-end in lines of wing extensions, which may be extended forwardly from the rack structure indefinitely within the limits of available floor area allotted to storage. In any extension member 25, bolt holes are arranged in the webs 31 also of juncture member 28 to render webs 31 companion to webs 23 of the juncture members 20 of any platform 15. The arrangements of bolt holes in webs 30 and 31 with reference to each other in a juncture member 28 of any wing extension 11 corresponds with bolt hole arrangements of webs 22 and 23 with reference to each other in the several juncture members 20 of any platform 15. Any leg 16 of my earlier invention to support platform 15 is attachable similarly to any juncture member 28 of any wing extension 11.

Whenever a wing extension 11 is attached to the front of rack structure, or attached to the last of a line of wing extensions extending away from rack structure, a leg 16 is attachable to project downwardly from the wing extension, as seen in Fig. 2, at end of the wing extension remote from its end of attachment, providing support for wing extensions at the same level as a platform rest consisting of platforms 15 attached to each other edge-to-edge. Also, any leg 16 is attachable to project upwardly from a wing extension 11 to support another wing extension which is attached at the other end of the leg and is positioned above the lower wing extension, to assemble tiers of wing extensions corresponding with the tiers in rack structure. Thus, rack structure may be expanded vertically in wing extensions, as well as horizontally in several directions extending away from the rack structure.

As seen in Fig. 1, adjacent wing extensions 11, which are attached as described at a front of rack structure consisting of rack units 12, project parallelly forward from a platform 15 at its respective opposite ends along the front of the rack structure, including the end platform in a line of platforms. In any extension member 25, its rest rail 26 is positioned in relationship to its juncture members 28 and transverse rails 27 to locate proximate rest rails of adjacent wing extensions 11 where they are engaged by a pallet 17 at its respective opposite edges in support of the pallet. Thus, proximate rest rails 26 of adjacent wing extensions 11 support pallet 17a at position 36, in line with the pallet 17 which is supported on corresponding platform 15 in the line. Similarly, proximate rest rails 34 and 35 are positioned to support another pallet 17 in the line. Thus, each of adjacent wing extensions is positioned to support a pallet 17 in a line of pallets extending to and including the corresponding platform 15.

The distance between proximate rest rails 26, in parallel lines of wing extensions 11, is wide enough to permit a pallet carrying truck travelling along aisle 37 to travel between lines of wing extensions, where the truck is in access to any pallet rest space of adjacent wing extensions and also of the corresponding platform 15. Each wing extension supports each of adjacent pallets along their proximate edges on the respective rest rails 26 of the extension members 25 that constitute the wing extension.

Applicant prefers to attach a complete wing extension 11 at the end of a row of platforms 15 attached to each other edge-to-edge, and adjacent single extension members 25, in the manner shown in Fig. 1. Although the rest rail 26 at each of these positions does not engage a pallet 17 along its depthwise edge, this structure adds strength, rigidity and stability to the whole of the rack structure of rack units 12 with wing extensions 11 attached thereto, for reasons that will appear more fully hereinafter. For like reasons, applicant prefers to attach an extension member 25 at the end of each row of platform 15, where the extension member serves as a stay member for rack unit 12 to which it is attached, and where the mutual support of four juncture members 20 attached to each other is not available as at positions 20.

As seen in Figs. 3 to 6 inclusive, and with particular attention to the detail of Fig. 7, abutment plate 41 is secured as by welding at each end of any extension member 25 to continue the thickness of web 30 of the juncture member 28 to the edge of web face 29 of rest rail 26. In any wing extension 11, abutment plates 41 provide flat abutment surface continuous with faces of webs 30 which extends throughout the extent of the wing extension at the end thereof. As seen in Fig. 7, this provides extended surface-to-surface contact between wing extensions 11 that are attached to each other end-to-end. Similar structure is provided in platforms 15 in abutment plates or pad 42, which are welded against transverse rails 19 and located appropriate distances away from juncture members 20 at respective opposite ends of the transverse rails. The abutment surface of pad 42 is flush with the face of the proximate frontage-wise web 22 of the juncture member 20 secured to the end of the transverse rail 19.

A bolt hole through each pad 42 and transverse rail 19 to which it is welded is located to register with a similar bolt hole through end plate 41 in the extension member 25 of the wing extension 11 that is attached to rack structure of platforms 15, and a bolt and nut 24 in each end plate 41 of a wing extension constitutes attachment of the wing extension to rack structure which is in addition to bolts 24 through companion webs 30 and 22 of respective juncture members 28 and 20 of the wing extension 11 and platforms 15. The distance between bolts 24 in the end of any wing extension 11 provides additional torque arm that resists turning moment of the load of a pallet bearing on one, or on each of both, rest rails 26 of any wing extension 11. Bolt holes in end plates 41 of different wing extensions 11 register with each other, and bolts and nuts 24 are positioned to provide like resistance to turning moment caused by the load of any pallet 17 anywhere throughout the structure of wing extensions.

Importance of this stabilizing structure is illustrated also in Fig. 1. In a wing extension 11, a box structure is provided which affords additional strength and stability. A similar box structure is provided between proximate rest rails 18 of any two platforms 15 which are attached to each other, and a similar box structure is provided between rest rail 26 of an extension member 25 and the proximate rest rail 18 of the platform to which it is attached.

One embodiment of the invention is disclosed in the drawings. The scope of the invention is defined in the accompanying claim.

I claim:

In rack structure providing a platform element having a pair of parallel transverse rails and a pair of parallel rest rails having their ends secured to said transverse rails to define a double-barrel H configuration, juncture elements secured to each end of each of said transverse rails, said juncture elements each constituting a length of angle iron extending above and below its juncture with said transverse rails and disposed parallel to the other juncture elements, normal to the length of said transverse rails and normal to the plane defined by said rest rails, wing extensions for said rack structure, said wing extensions comprising a pair of parallel rails, rails extending from each end of each of said parallel rails normal to the length of said parallel rails and in the plane defined by said parallel rails, a first juncture element coupling the end of a first of said extending rails distal its parallel rail to the end of a second of said extending rails distal its parallel rail, a second juncture element coupling the end of a third of said extending rails distal its parallel rail to the end of a fourth of said extending rails distal its parallel rail, said juncture elements each constituting a length of angle iron extending above and below its juncture with said extending rails and disposed parallel to and adapted to mate with and be coupled to the juncture elements of the platform element, whereby a pallet can be supported by the adjacent rails of adjacent wing extensions, and such adjacent rails of adjacent wing extensions define an aisle for access to said platform element.

References Cited in the file of this patent

UNITED STATES PATENTS

| | | |
|---|---|---|
| 372,549 | McDonald | Nov. 1, 1887 |
| 750,645 | Hart | Jan. 26, 1904 |
| 1,707,576 | Schubert | Apr. 2, 1929 |
| 2,815,130 | Franks | Dec. 3, 1957 |
| 2,825,470 | Dahlin | Mar. 4, 1958 |